United States Patent [19]

Takagi et al.

[11] Patent Number: 5,706,700
[45] Date of Patent: Jan. 13, 1998

[54] OVERRUNNING CLUTCH FOR STARTERS

[75] Inventors: Yoshito Takagi, Toyohashi; Tsutomu Shiga, Nukata; Yasuhiro Nagao, Okazaki, all of Japan

[73] Assignee: Nippondenso Co., Ltd., Kariya, Japan

[21] Appl. No.: 705,041

[22] Filed: Aug. 30, 1996

Related U.S. Application Data

[63] Continuation of Ser. No. 381,498, Jan. 31, 1995, abandoned.

[30] Foreign Application Priority Data

Sep. 7, 1994 [JP] Japan ................................. 6-213707

[51] Int. Cl.$^6$ ........................................................ F02N 15/02
[52] U.S. Cl. ............................ 74/7 C; 192/45; 188/82.84
[58] Field of Search ......................... 192/45, 42, 44; 74/7 C; 188/82.84

[56] References Cited

U.S. PATENT DOCUMENTS

| | | | |
|---|---|---|---|
| 1,375,576 | 4/1921 | Duca . | |
| 2,286,419 | 6/1942 | Krenzke . | |
| 2,566,445 | 9/1951 | Gilbert et al. | 74/7 C |
| 3,132,574 | 5/1964 | Ernisse . | |
| 4,464,576 | 8/1984 | Williams | 74/7 C |
| 4,770,054 | 9/1988 | Ha | 192/45.1 |
| 4,852,708 | 8/1989 | Parkhurst | 74/7 C |
| 4,881,698 | 11/1989 | Doiron | 192/45 |
| 4,918,344 | 4/1990 | Isozumi . | |
| 4,986,140 | 1/1991 | Morishita et al. | 74/7 C |
| 5,199,309 | 4/1993 | Isozumi | 74/7 C |
| 5,276,945 | 1/1994 | Matsumura . | |
| 5,549,011 | 8/1996 | Shiga et al. | 74/7 C |

FOREIGN PATENT DOCUMENTS

| | | |
|---|---|---|
| 985374 | 7/1951 | France . |
| 89 00284 | 7/1989 | France . |
| 52-19528 | 7/1959 | Japan . |
| 59-26107 | 7/1984 | Japan . |
| 14023 | 3/1897 | Switzerland . |
| 124821 | of 1959 | U.S.S.R. . |
| 19181 | of 1903 | United Kingdom . |
| 140380 | 12/1920 | United Kingdom . |
| 22203 | 7/1989 | United Kingdom . |

OTHER PUBLICATIONS

Patent Abstracts of Japan, vol. 9, No. 73 (M–368) Mar. 1985 re JP 59203869.

*Primary Examiner*—Charles A. Marmor
*Assistant Examiner*—David M. Fenstermacher
*Attorney, Agent, or Firm*—Cushman, Darby & Cushman IP Group of Pillsbury Madison & Sutro LLP

[57] ABSTRACT

An overrunning clutch that can absorb the impact torque, and accurately and easily conveys the maximum torque. A clutch outer tubular portion and inner tubular portion are separately fixed on an internal gear and a center case of an epicycle gear reduction mechanism. A wedge-shaped groove is formed on one of an inner circumference of the outer tubular portion and an outer circumference of the inner tubular portion to accomodate a rolling element. A fitting concave portion to fit the rolling element is formed on the other one of the inner circumference of the outer tubular portion and the outer circumference of the inner tubular portion. With this, the torque value generated when the rolling element leaves the fitting concave portion can be accurately set just by setting the depth of the fitting concave portion. The radial force that acts on the opposite direction of the tubular portions holding the rolling element can be reduced. This allows the strength of the tubular portions to be reduced, and the weight to be lightened. As the torque is not conveyed with frictional force, the wear is also reduced.

16 Claims, 7 Drawing Sheets

OVERRUNNING CLUTCH FOR STARTERS

CROSS REFERENCE TO RELATED APPLICATION

This is a continuation of application Ser. No. 08/381,498, filed on Jan. 31, 1995, which was abandoned upon the filing hereof.

This application is based upon and claims priority from Japanese Patent Application No. 6-213707 filed Sep. 7, 1994, the content of which is incorporated herein by reference.

BACKGROUND OF THE INVENTION

1. Field of the Invention

The present invention generally relates to an overrunning clutch used in starters for starting engines.

2. Related Art

In Japanese Utility Model Publication No. 59-26107, a device is disclosed, in which an overrunning clutch used in starters for starting engines has an optimum angle for a wedge-shaped space for rollers and has a fitting portion to protrude from a drive body, and in which rollers that engage with the wedge-shaped space directly contact to fix the engagement amount, thereby absorbing the impact torque by conveying the overrunning clutch with a constant torque.

In the above overrunning clutch, the fitting section has to be set to a designated position in order to make the engagement amount constant. However, the contact surface of the rollers that contact the inner circumferential surface of the clutch outer member and the outer circumferential surface of the clutch inner member is greatly affected by slight inclinations of the wedge-shaped space, and thus an accurate position cannot be set. As a result, the maximum value of the conveyance torque cannot be accurately set, and the absorption of the impact torque is insufficient.

SUMMARY OF THE INVENTION

In view of the above problems, the present invention has as a primary object to provide an overrunning clutch for starters, in which the conveyance torque value for absorbing the impact torque can be accurately set.

According to the present invention, one of an outer tubular portion and an inner tubular portion of an overrunning clutch that are set radially with a clearance and face each other so as to (relatively) rotate freely, relative to one another, has a wedge-shaped groove to accommodate a rolling element. The other one of these tubular portions have a concave portion to engage the rolling element. The concave portion has a depth in which the rolling element can be received when an excessive impact torque exceeding the designated starter drive torque is applied. In other words, when an excessive torque exceeding the designated value is applied, the rolling element moves from the one fitting concave portion to an adjacent fitting concave portion, so both tubular portions relatively rotate and the excessive torque is not conveyed between the two tubular portions.

Especially with this structure, the rolling element is fit (dropped) in the fitting concave portion so the designated value of the impact torque, when relative rotation or both tubular portions starts with the separation of the rolling element, can be determined by the depth of the fitting concave portion. In other words, the depth of the fitting concave portion is large in comparison with the roller manufacturing error so the impact torque designated value can be determined easily and accurately by determining the depth of the fitting concave portion.

Further, wear of the outer circumference of the tubular portion that does not have the wedge-shaped groove can be reduced and the parts can be reduced in weight. When the functioning force between the rolling element and the fitting concave portion is considered in a stable state where the rolling element is fit with the fitting concave portion, if the torque is P and the force that functions on the radial directions of both tubular portions with the concave surface of the fitting concave portion is M, then $M = P \times \tan\theta$. As $\theta$ is a value that changes according to the shape of the fitting concave portion, the radial direction force M can be remarkably reduced as compared with the case where the torque is conveyed with the conventional friction. Therefore, as the radial direction force M that functions on the opposing directions of the tubular portions sandwiching the rolling element can be reduced, the strength of these tubular portions can be reduced allowing the part to be compact and light in weight. Furthermore, even if one or both ends of the tubular portions deform in the radial direction (especially on side with the clearance enlarged), as long as the rolling element has not separated from the fitting concave section as in fit, the contact position of the fitting concave portion that contacts the rolling element will only deviate slightly, and thus, the conveyance torque will not change drastically. Thus, drastic deformation of the tubular portions in the radial direction can be tolerated, allowing the rigidity of the tubular portions to be lowered and the overrunning clutch to be lighter in weight.

Furthermore, as the torque is not conveyed with the frictional force between the tubular portion that does not have the rolling element and the wedge-shaped groove, the friction coefficient between the rolling element and the surface that slides and contacts with it can be set to a smaller value, thereby drastically reducing the wear. Use of materials that conventionally were inferior in friction resistance properties can thus be used for the tubular portions.

Contacting of the rolling element with the concave surface of the fitting concave portion is suitable for avoiding stress concentration, and thus setting the curvature radius of the concave surface of the concave surface to the same value or slightly larger than the radius of the rolling element is favorable.

DETAILED DESCRIPTION OF THE PRESENTLY PREFERRED EMBODIMENTS

The present invention will be described in detail with reference to various embodiments illustrated in the accompanying drawings.

(First Embodiment)

Figure 1:
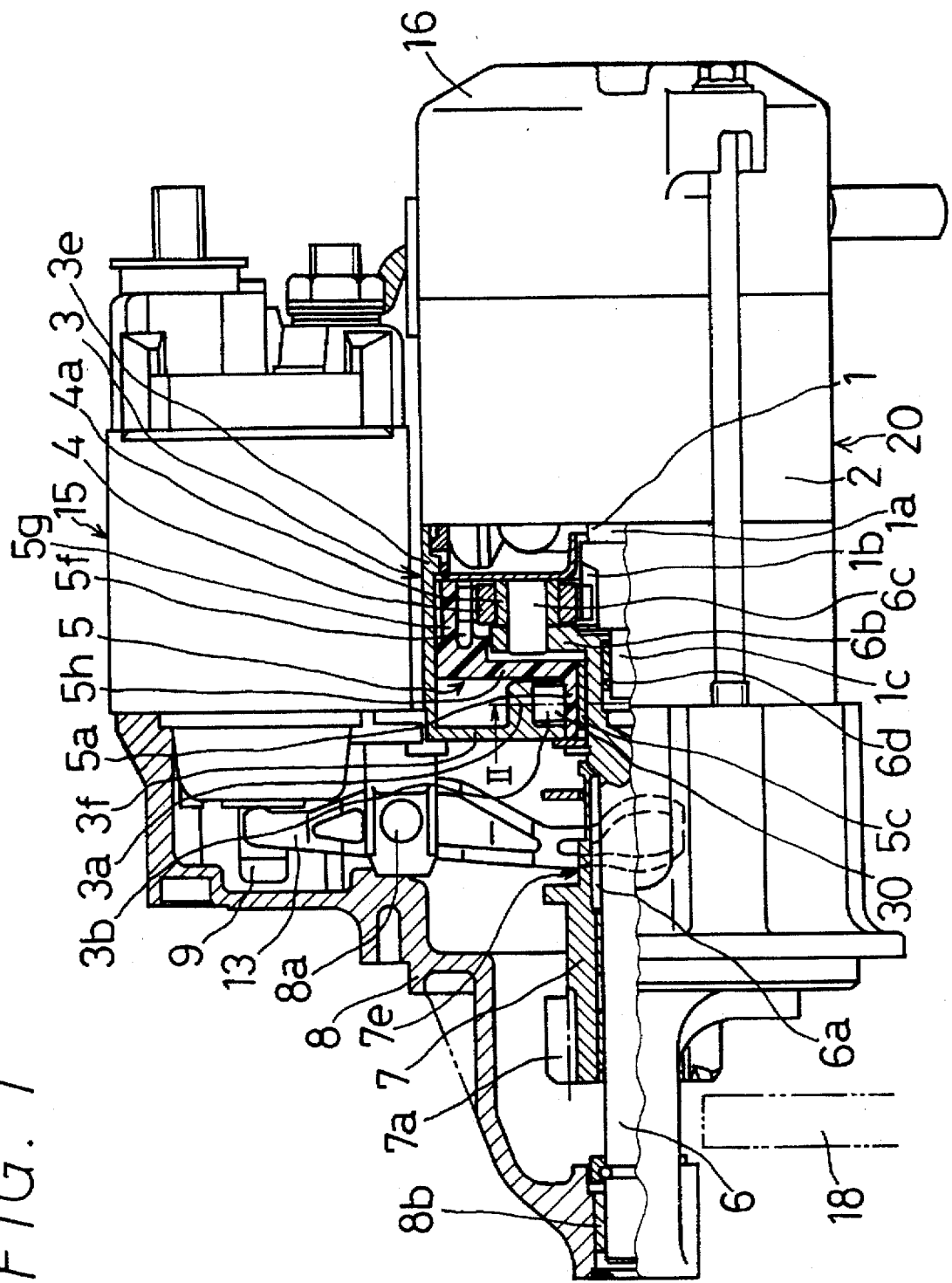
FIG. 1 is a cross-sectional view illustrating, partly in cross section, a starter having an overrunning clutch according to the first embodiment of the present invention.

A starter with an epicycle gear speed reduction mechanism is illustrated in FIG. 1.

A starter motor 20 is fastened to the right end of a housing 8, and a magnet switch 15 shown on the upper side of the starter motor 20 in the figure is fastened to the housing 8.

The right end of an armature shaft 1 is supported by an end bracket 16 of the starter motor 20, and a left small diameter portion 1c of the armature shaft 1 is supported by a bearing 6d in the inside of the right concave portion or a drive shaft 6.

The starter motor 20 has a cylindrical yoke 2. The left end of the armature shaft has a large diameter portion 1a on the outer circumference of which sun gear 1b is formed, and a small diameter portion 1c that protrudes from the large diameter portion 1a.

The drive shaft 6 extends toward the left along the same shaft center as the armature shaft 1 shown in the figure. The left end is supported by housing 8 via a bearing 8b, and the right end is supported by an internal gear 5 via a bearing 5c.

On one end portion and at a center portion outer circumference of the drive shaft 6, a spline tube 7 formed with a pinion gear 7a is helical-spline fit by a helical spline groove 6a of the drive shaft 6. A shift lever 13 is supported at a support portion 8a formed in the housing 8. One end of the shift lever 13 is fit with the outer circumference 7e of the spline tube 7, and the other end of the shift lever 13 is coupled with a hook 9 connected to a plunger (not illustrated) of the magnet switch 15.

Next, an epicycle gear speed reduction mechanism will be explained.

A flange-shaped large diameter portion 6b is formed on the right end of the drive shaft 6. The projections of the multiple pins 6c fit into through-holes of the large diameter portion 6b each rotatably supporting an epicycle gear 4 via a bearing 4a.

These epicycle gears 4 fit with the sun gear 1b on the large diameter portion 1a, and fit with the inner teeth 5f of the internal gear 5.

The internal gear 5 has a cylindrical shape with both ends open, and comprises a large diameter tubular portion (inner teeth tubular portion) 5g formed by inner teeth 5f on the inner circumference, an end wall portion 5h that extends in the inner radial direction from the left end of the large diameter tubular portion 5g, and the small diameter tubular portion 5a that extends axially from the inner end of the end wall portion 5h. The bearing 5c for supporting the drive shaft 6 is fit into the small diameter cylinder portion 5a and is arranged concentrically with the armature shaft 1.

A center case (casing) 3 has an approximately cylindrical shape with a bottom base, the outer circumference of which is fixed to the housing 8, thereby forming the gear chamber where the epicycle gear speed reduction mechanism is accommodated. The center casing 3 comprises a large diameter tubular portion 3e, end wall portion 3f that extends in the inner radial direction from the left end of large diameter tubular portion 3e, and a small diameter cylinder portion 3a that extends axially from the inner end of the end wall portion 3f.

The center case 3 is fixed in a state such that it is axially sandwiched between the yoke 2 and housing 8. An engine ring gear 18 is engageable with the pinion gear 7a.

Next, an overrunning clutch 30 of this embodiment will be explained.

Figure 2:
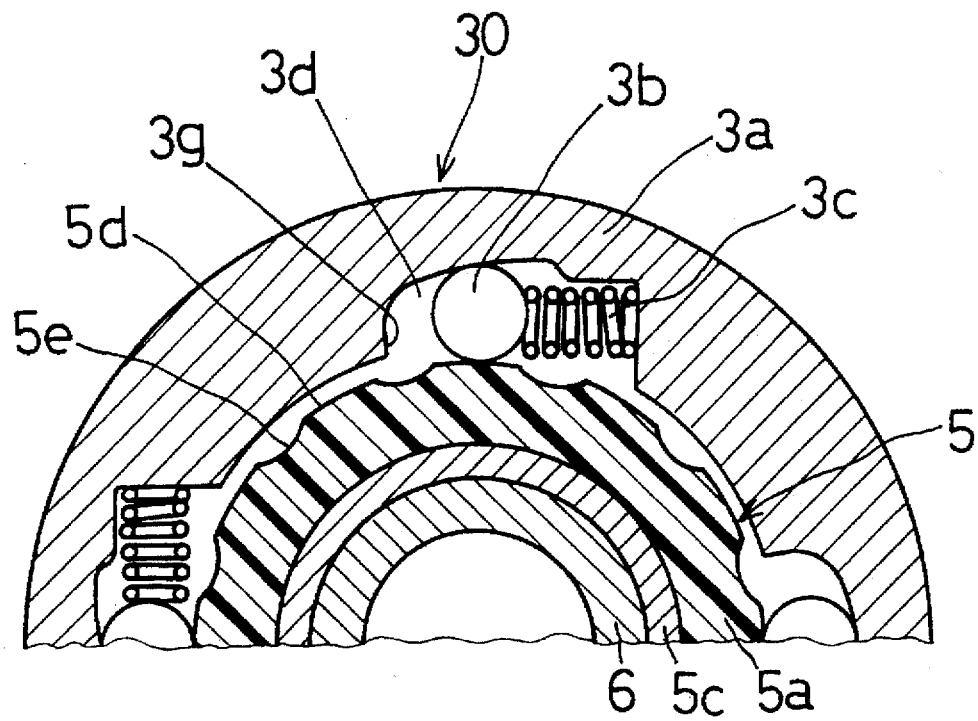
FIG. 2 is a cross-sectional view illustrating a clutch portion taken along a line II in FIG. 1 in the case of the starter overrunning.

The small diameter cylinder portion 5a (inner cylinder potion) of the internal gear 5, and the small diameter cylinder portion 3a (outer cylinder potion) of the center case 3 define the overrunning clutch 30 together with a clutch roller 3b (rolling element) and spring 3c, explained below, placed therebetween (FIG. 2). The end wall portion (base) 5h of the internal gear 5 and the end wall portion 3f of the center case 3 can slide with both ends of the clutch roller 3b, so axial deviation of the clutch rollers 3b is restricted.

A radially expanded cross-sectional view of the overrunning clutch 30 viewed along the line II in FIG. 1 is illustrated in FIG. 2. It should be noted that the following structure is provided at a plurality of places circumferentially.

In this embodiment, the small diameter cylinder portion 3a of the center case 3 functions as an outer race (clutch outer member) of the overrunning clutch 30. Tapered notch portions (wedge-shaped grooves) 3d are formed at circumferentially uniform intervals on the inner surface. The small diameter cylinder portion 5a of the internal gear 5 functions as an inner race (clutch inner member) of the overrunning clutch 30, and indentations 5e (fitting concave portions) are formed at circumferentially uniform intervals on the outer surface with an integer-fold of the tapered notched portion 3d. A wedge-shaped clearance or space is formed between the circumferential surface between the indentations 5e and the tapered notched portion (wedge-shaped groove) of the small diameter cylinder portion 3a of the center case 3. Round roller 3b (clutch roller) is mounted in tapered notched portions 3d so as to move therein and spring 3c (clutch spring) presses the roller 3b to the shallow base portion, or in other words, in the direction that the radial width of the wedge-shaped groove decreases.

The wedge-shaped groove 3d of the overrunning clutch 30 is formed to be constrained in the direction that the load is applied on the internal gear 5 when the armature of starter motor 20 rotates and the rotational force is conveyed to the epicycle gear reduction mechanism.

Next, the operation of the starter in the first embodiment will be explained.

When a starter switch (not illustrated) of an engine (not illustrated) is closed and the magnet switch 15 functions, and the hook 9 connected to the plunger (not illustrated) rotates the shift lever 13. The shift lever 13 advances the spline tube 7 and pinion gear 7a towards the ring gear 18 of the engine.

When the pinion gear 7a engages the ring gear 18, and the power supply to the starter motor contact (not illustrated) of the magnet switch 15 closes, armature shaft 1 rotates, causing the epicycle gears 4 to rotate via the sun gear 1b. The epicycle gears 4 starts to rotate the internal gear 5.

When the internal gear 5 rotates, the clutch roller 3b above the small diameter cylinder portion 5a of the internal gear 5 is displaced toward the left in FIG. 2 in the wedge-shaped groove 3d due to friction and biasing from the spring 3c. When the wedge-shaped groove 3d moves toward the left in FIG. 2, the radial clearance starts to contract causing the small diameter cylinder portion 5a of the internal gear 5 to be fixed to the small diameter cylinder portion 3a of the center case 3 via the clutch roller 3b.

Figure 3:
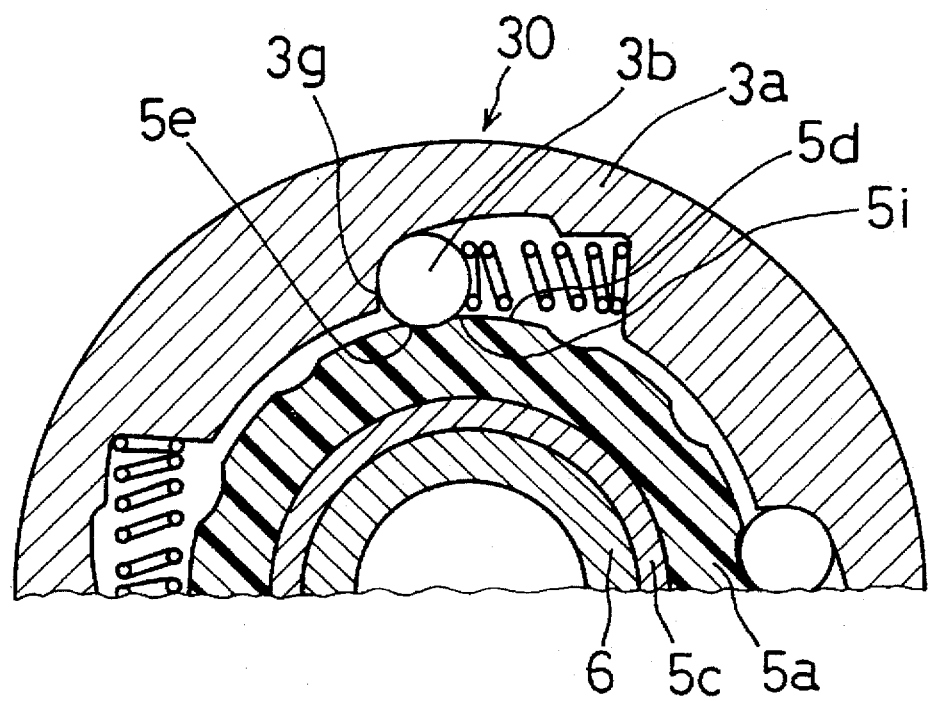
FIG. 3 is a cross-sectional view illustrating the clutch portion taken along the line II in FIG. 1 in the case of starter drive.

If the clutch roller 3b is positioned on one of the indentations 5e of the small diameter cylinder portion 5a of the internal gear 5, the clutch roller 3b is moved to the end point wall 3g of the wedge-shaped groove 3d by the rotation of the internal gear 5 and with the right shoulder 5i of indentations 5e as shown in FIG. 3. This causes the small diameter cylinder portion 5a of the internal gear 5 to be fixed to the smaller diameter cylinder portion 3a of the center case 3 via the clutch roller 3b.

With this, the rotation of the armature shaft 1 is decelerated with the epicycle gears 4 and the drive shaft 6 is driven in a reduced speed. The drive shaft 6 advances while rotating the spline tube 7 via the helical spline groove 6a, and the pinion gear 7a engaging the ring gear 18 drives the same for engine starting.

When an excessive load is applied on the starter while the starter is driving the engine, if the clutch roller 3b is at a position other than on the indentation 5e of the small diameter cylinder portion 5a of the internal gear 5, the clutch roller 3b is pressed further in the narrow direction of the wedge-shaped groove 3d, and the load is handled when the end point wall 3g of the wedge-shaped groove 3d is reached. For even higher loads, a slip occurs between the clutch roller 3b and the surface of the small diameter cylinder portion 5a of the internal gear 5 causing the internal gear 5 to rotate. The clutch roller 3b drops into the indentation 5e of the small diameter cylinder portion 5a of the internal gear 5, and the clutch rollers 3b is fit with the right shoulder portion 5i of the indentation 5e in the same manner as described above, and the torque conveyance according to that load is the same as that described above.

If an excessive load that cannot be handled is applied, the excessive torque conveyance is restricted by moving the clutch roller 3b to the neighboring indentation 5e of the small diameter cylinder portion 5a of the internal gear 5 that forms the clutch inner.

When the engine is started successfully, the starter motor 20 is overrun by the ring gear 18. The starter receives the torque from the ring gear 18 via the pinion gear 7a, and the epicycle gears 4 rotate at a higher speed than before. The internal gear 5 receives a torque in the opposite direction from that during the above driving operation. With this, the clutch roller 3b presses the spring 3c, and moves to a position inside the wedge-shaped groove 3d where the right side radial clearance widens. This causes the lock between the small diameter cylinder portion 5a of the internal gear 5 and the small diameter cylinder portion 3a of the center case 3 to be released. As a result, the internal gear 5 can rotate in the opposite direction from that locked with the center case 3. With this the internal gear 5 rotates so as to absorb the free rolling of the epicycle gears 4 generated by the relative rotational difference of the drive shaft 6 and the armature shaft 1 so the armature is not rotated above the no-load rotation by the engine.

As explained hereinabove, the clutch 30 in this embodiment has a small diameter cylinder portion 3a to support the drive shaft 6 of center case 3 as the clutch outer member, with tapered notched portion 3d (wedge-shaped grooves formed) of which the inner diameter gradually expands, circumferentially on the inner circumference thereof. The small diameter portion 5a of the internal gear 5 is used as the clutch inner, member with indentations 5e which are an integer times as many as the tapered notched portion 3d provided on the outer circumference thereof and a clutch roller 3b is arranged between the tapered notched portion 3d and small diameter cylinder portion 5a of the internal gear 5. To receive the rotational force generated when the starter motor 20 is driven by the center case 3 via the internal gear 5 and convey it to the drive shaft 6, the clutch roller 3b is interposed between the shoulder portion 5i of the indentations 5e on the smaller diameter cylinder portion 5a of the internal gear 5 and the end point wall 3g of the tapered notched portion 3d of the small diameter cylinder portion 3a of the center case 3 to lock the rotation of the internal gear 5. Thus, this clutch differs from the conventional clutch that conveys the torque with the frictional force that corresponds to the Hertz strain that occurs on the contact surface when the clutch roller is bit into the wedge-shaped space, in that resin material with a low mechanical strength can be used for the clutch inner and clutch outer.

Figure 4A:
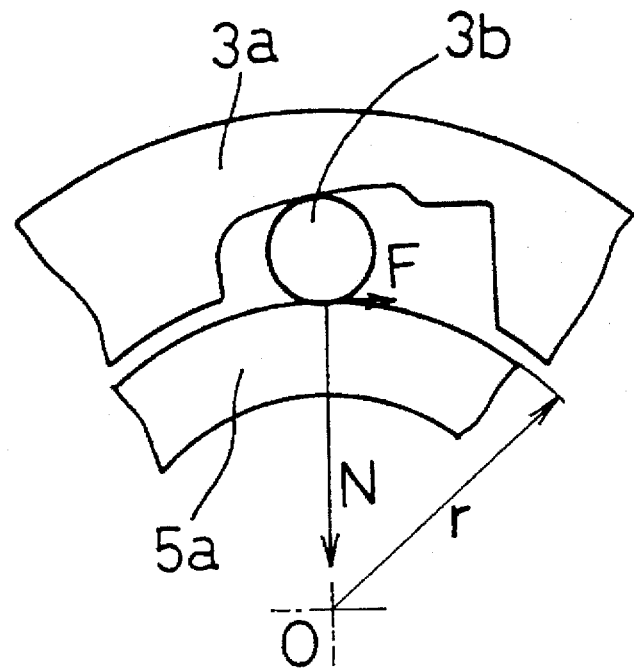
FIGS. 4A and 4B are schematic views illustrating operations of the conventional overrunning clutch of the first embodiment, respectively.

The relation of the force that functions during the conventional clutch torque conveyance is shown in FIG. 4A. The torque T that acts on the roller rolling surface of the small diameter cylinder portion 5a is expressed by the following equation with the radius of the small diameter cylinder portion 5a being r, the frictional force between the small diameter cylinder portion 5a and roller 3b being F, and the number of rollers being n.

$$T = r \times F \times n$$

The frictional force F between the small diameter cylinder portion 5a and roller 3b is expressed as follows with the resistance that acts vertically on the roller rolling surface of the small diameter cylinder portion 5a being N, and the friction coefficient between the small diameter cylinder portion 5a and roller 3b being $\mu$, $$F = \mu \times N$$

The value of $\mu$ in the conventional starter roller type overrunning clutch is approximately 0.4, so the surface of the small diameter cylinder portion 5a must withstand a resistance N that is approximately 2.5 times the frictional force F between the roller 3b.

Figure 4B:
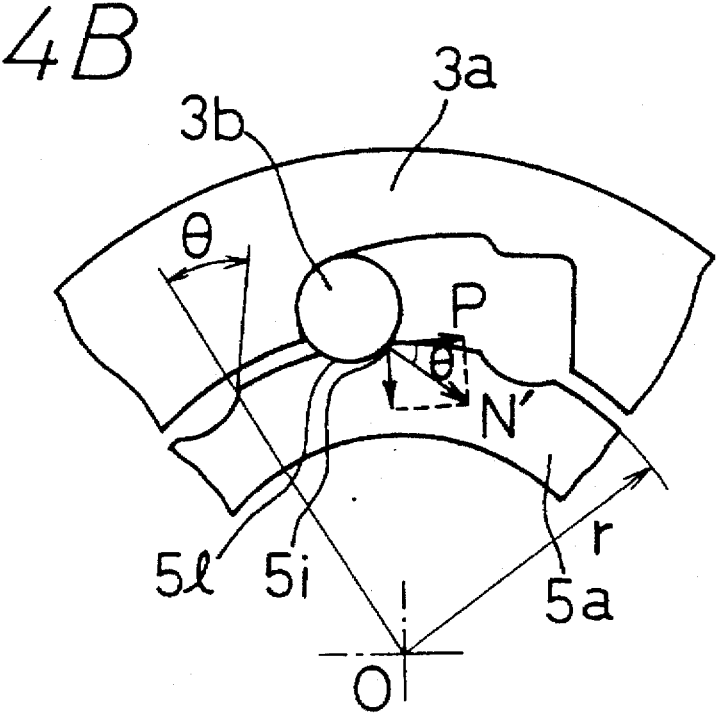

However, with the overrunning clutch in this embodiment, as shown in FIG. 4B, if the resistance applied vertically to the shoulder surface 5i of the indentation 5e that fits with the clutch roller 3b is N', and if the angle created by the line connected with that point and the radius line of the small diameter cylinder portion 5a is $\theta$, the rotational direction force P can be expressed as follows.

$$P = N' \times \cos \theta$$

The torque T can be expressed as follows in the same manner.

$$T = r \times P \times n = r \times n \times N' \times \cos \theta$$

If the angle $\theta$ is set as 20° which is the same as the pressure angle of the flat gear that is the normal reduction gear, then the resistance N' that acts on the side of the indentation 5e that directly contacts the clutch roller 3b will be approximately 1.06 times the rotational direction force P.

To achieve the designated torque, the frictional force F in FIG. 4A and the rotational force pressure P that acts on the indentation 5e in FIG. 4B only need to be equal, so the strain that faces the inner portion of the small diameter cylinder portion 5a in this embodiment only needs to be approximately two-fifths compared with the conventional clutch.

When the small diameter cylinder portion 51 does not have indentation 5e and only has a roller sliding contact cylinder surface as in the conventional clutch, if the small diameter cylinder portion 5a is manufactured with a material that elastically deforms such as resin so as to restrict the relative rotation of the roller 3b and small diameter cylinder portion 5a with frictional force, sliding will occur easily due to the elastic deformation.

Due to this, the overrunning clutch 30 in this embodiment can convey the torque without using material that can withstand an excessive Hertz strain for the clutch inner, and part of the internal gear 5 made of resin can be used for the clutch inner allowing an inexpensive and lightweight overrunning clutch to be provided.

Furthermore, as the overrunning clutch according to this embodiment does not require frictional force, the clutch is overrun by the engine, and the clutch roller rolls over the inner surface preventing wear. Thus, the friction coefficient of the lubricant, such as grease, injected in the clutch can be low (for example, grease with a friction coefficient of about 0.3 or less, and more preferably less than 0.18), and the clutch durability can be drastically improved.

The internal gear 5 in this embodiment is formed with 66 nylon, and the center case 3 is easily formed by deep drawing and multi-step pressing carbon steel plates, however, using other manufacturing methods and materials is also possible. Rollers were used as the rolling element between the overrunning clutch outer and inner, but the same effect can be achieved with spherical balls.

(Second Embodiment)

Figure 5:
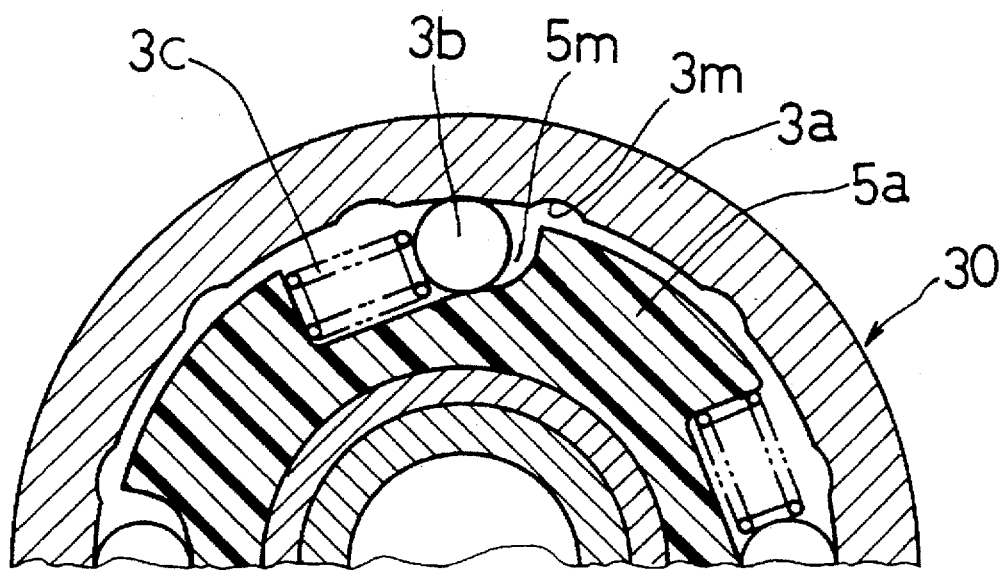
FIG. 5 is a cross-sectional view illustrating the clutch portion according to the second embodiment of the present invention.

The second embodiment example will be explained with reference to FIG. 5.

In this embodiment, wedge-shaped groove 5m are formed on the side of internal gear 5 and indentations 3m are formed on the center case 3. Thus, the similar function and effect as in the first embodiment are attained.

Of course, wedge-shaped groove 5m can be formed on the side of internal gear 5 and indentations (fitting concave portions) on the side of center case 3 in the fourth embodiment explained later.

(Third Embodiment)

Figure 6:
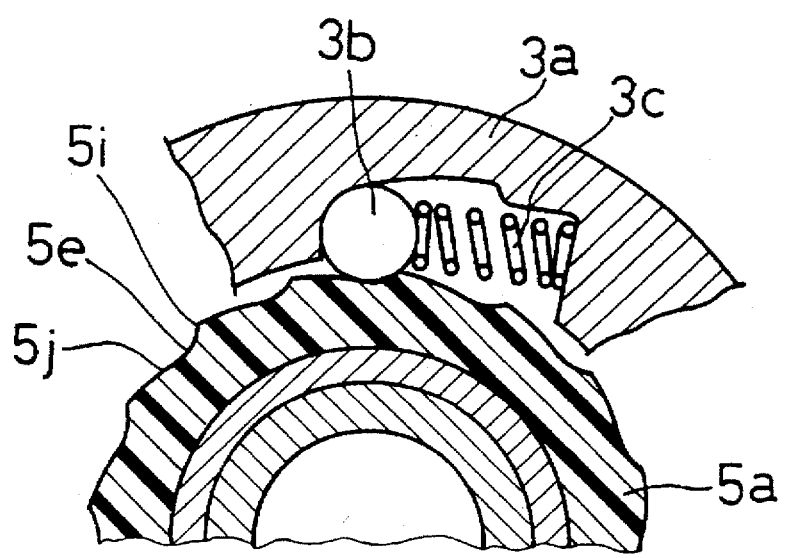
FIG. 6 is a cross-sectional view illustrating the clutch portion according to the third embodiment of the present invention.

The third embodiment will be explained with reference to FIG. 6.

In this embodiment the shape of the left shoulder in the illustration of indentations 5e of the small diameter cylinder portion 5a of internal gear 5 (FIG. 2 and FIG. 3) is connected with a continuous smooth curve 5j to the right shoulder 5i of the indentation 5e neighboring on the left.

With this shape, if the starter is overrun by the engine, the impact is eased and abnormal noise is suppressed when the clutch roller 3b passes through the left shoulder 5j of the indentation 5e.

(Fourth Embodiment)

Figure 7:
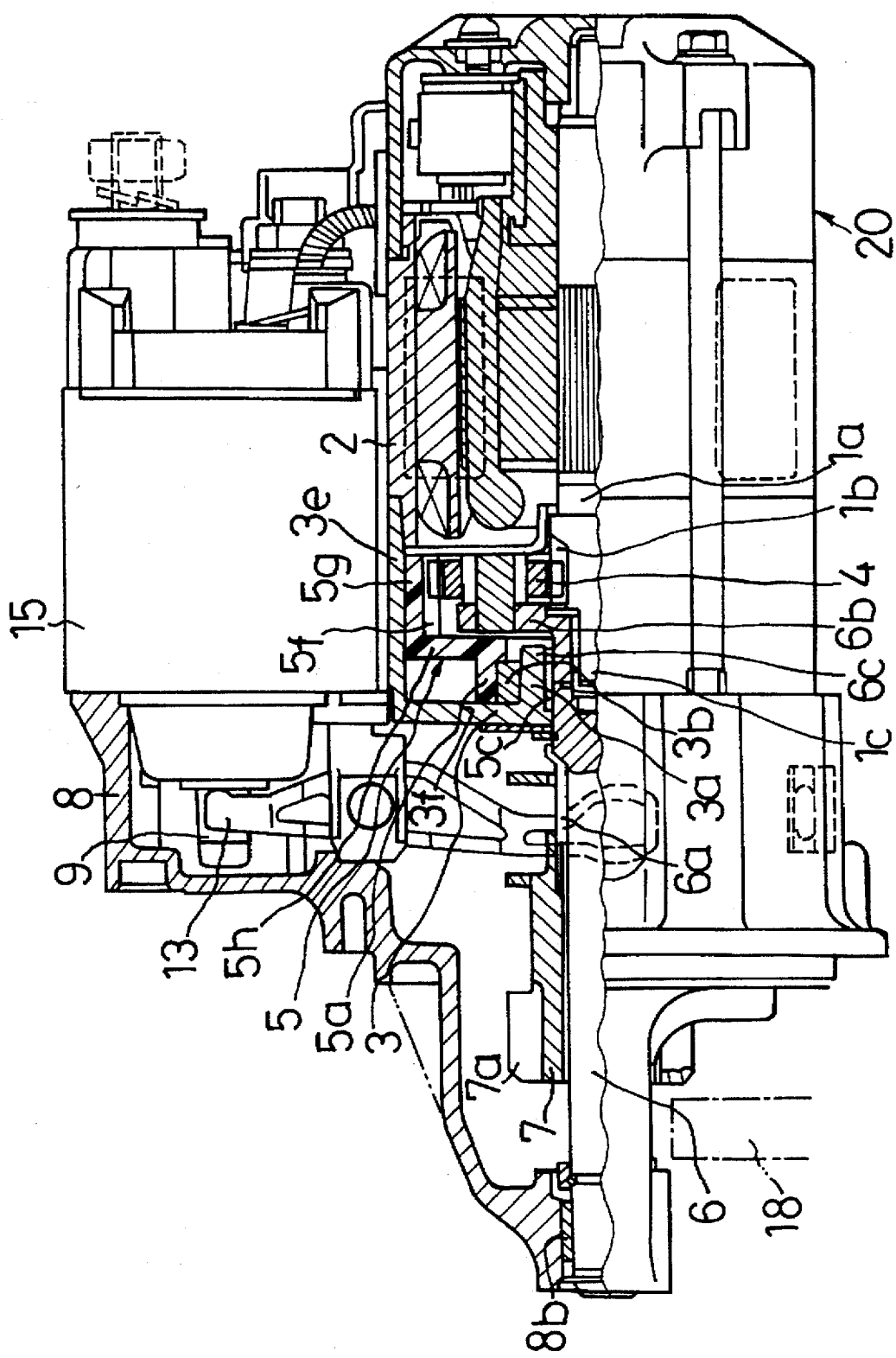
FIG. 7 is a cross-sectional view illustrating, partly in cross section, the starter having the overrunning clutch according to the fourth embodiment of the present invention.

The fourth embodiment will be explained with reference to FIG. 7.

In this embodiment, the drive shaft 6 is supported by the small diameter cylinder portion 3a of the center case 3 via the bearing 5c, and the clutch roller 3b is arranged between the outer circumference of the small diameter cylinder portion 3a of the center case 3 and the inner circumference of the small diameter cylinder portion 5a of the internal gear 5. Thus, the wedge-shaped groove is formed by the small diameter cylinder portion (outer tubular portion, clutch outer member) on the side of internal gear 5. The indentations (fitting concave portion) are formed on the small diameter cylinder portion (inner tubular portion, clutch inner member) 3a on the side of center case 3. Even with this structure, the same effect as the first embodiment can be achieved.

Further functions and effects of the overrunning clutch of this embodiment are explained below.

Figure 8:
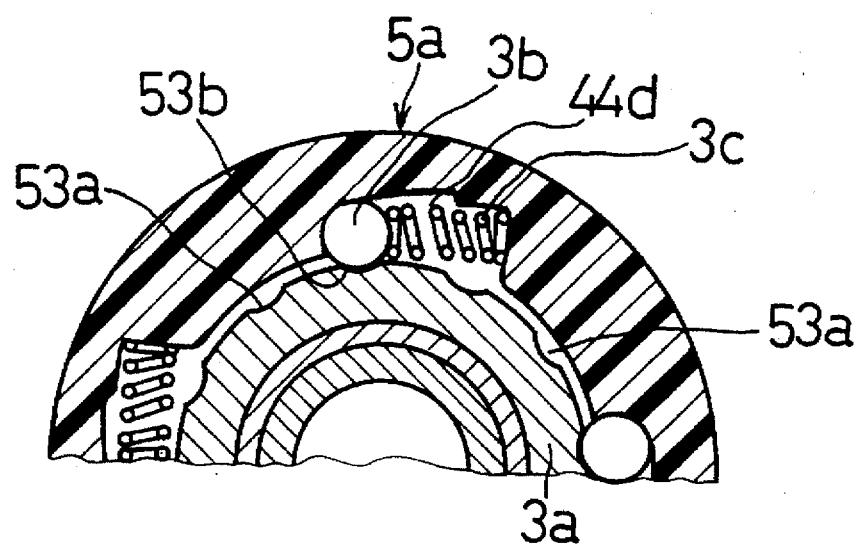
FIG. 8 is a cross-sectional view illustrating the clutch portion in FIG. 7 in the case of starter drive.
Figure 9:
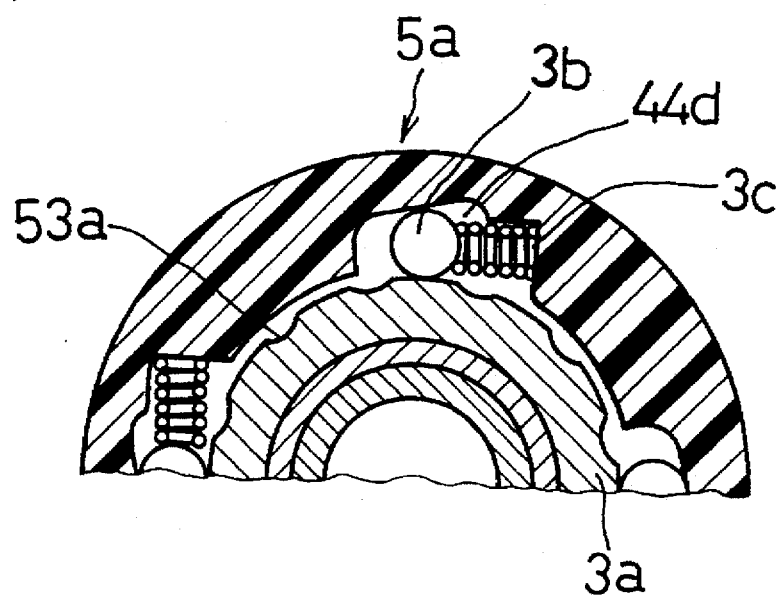
FIG. 9 is a cross-sectional view illustrating the clutch portion in FIG. 7 in the case of the starter overrunning.

FIG. 8 and FIG. 9 are radially enlarged cross-sectional views of the overrunning clutch in the fourth embodiment. FIG. 8 shows the state during torque conveyance to the drive shaft, and FIG. 9 shows the overrun state.

A wedge-shaped groove 44d for the roller 3b and spring 3c explained hereinabove are formed on the small diameter cylinder portion 5a of the internal gear 5 that is the clutch outer member. Furthermore, fitting concave portions 53a in which the roller 3b is stored between the wedge-shaped groove 44d during torque conveyance are formed on the small diameter cylinder portion 3a of the center case 3 that is the clutch inner member.

Next the operation is explained.

When the starter motor 20 is started and is overrun, the pinion gear 7a receives an excessive torque from the ring gear 18 and the epicycle gear 4 rotates at high speed. The internal gear 5 receives a torque in the opposite direction from that during driving and start rotating. With this, the clutch roller 3b presses the spring 3c with the reaction and centrifugal force from the inclined surface 53b of the fitting concave portion 53a of the clutch inner 3a, and moves to a position inside the wedge-shaped groove 44d where the right side radial clearance widens. This causes the lock between the small diameter cylinder portion 5a of the internal gear 5 and the center case 3 to be released, thereby cutting off the contact of the clutch inner 3a and roller 3b.

Should the engine misfire for some reason, the rotation of the internal gear 5 drops with the drop in the engine (pinion) rotation, and at the same time the centrifugal force of the roller 3b drops. The internal gear 5 stops so that the rotation of the pinion 7a directly coupled with engine ring gear 18 and rotation of the armature shaft 1 after deceleration are the same, and at that instant, the roller 3b is pressed onto the left side of the wedge-shaped groove 44d of the clutch outer member 5a with the spring force causing the drive state explained earlier.

As explained above, in the overrunning clutch in this embodiment, a centrifugal force is exerted on the roller 3b which starts rotating with the internal gear 5 when an overrun occurs. This moves the roller 3b toward the clutch couplingrelease direction (compression direction of spring 3c) along the base of the wedge-shaped groove 44d, and cuts off the contact between the clutch inner 3a and allows the friction to be reduced. Therefore, the impact that occurs when the internal gear 5 starts rotating is small. This allows a drastic reduction is size and weight.

(Fifth Embodiment)

Figure 10:
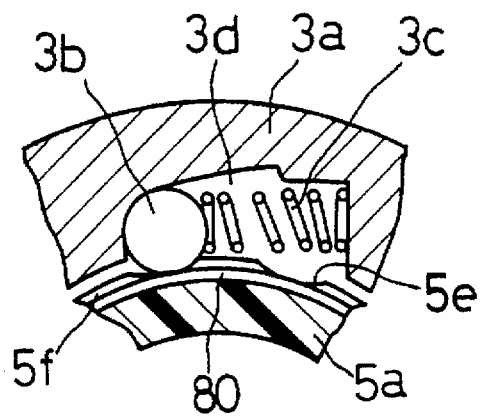
FIG. 10 is an enlarged cross-sectional view illustrating the overrunning clutch according to the fifth embodiment of the present invention.
Figure 11:
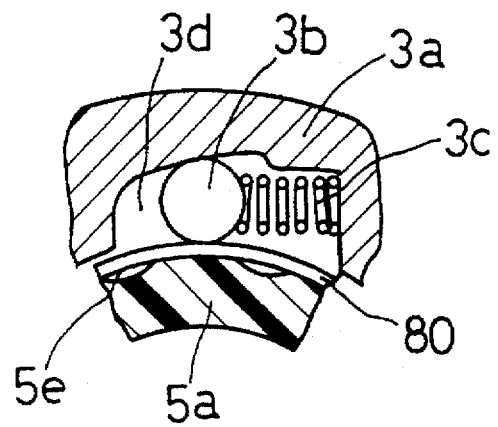
FIG. 11 is an enlarged cross-sectional view illustrating the overrunning clutch of the fifth embodiment in the case of the starter overrunning.
Figure 12:
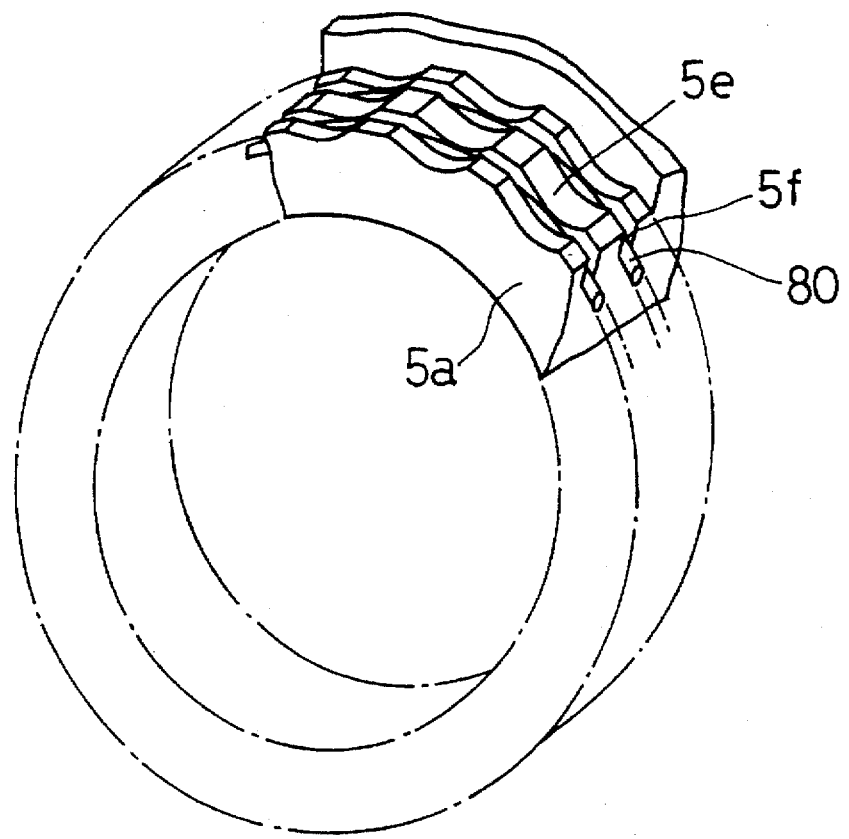
FIG. 12 is a schematic perspective view illustrating the clutch inner member and elastic body used in the fifth embodiment.

The fifth embodiment will be explained with reference to FIG. 10, FIG. 11 and FIG. 12. FIG. 10 shows the state of torque conveyance to the drive shaft 6, FIG. 11 the state when the internal gear 5 rotates with overrunning of the starter, and FIG. 12 the relation between the roller inner 5a and elastic body 80.

In this embodiment, shallow ring-shaped grooves 5f are formed circumferentially on the outer circumference of the small diameter cylinder portion 5a of the internal gear 5 using the first embodiment (FIG. 2). Ring-shaped elastic bodies 80 are mounted in the axially adjacent ring-shaped groove 5f.

When the clutch inner 5a rotates, the elastic bodies 80 expand radially due to centrifugal force and press up roller 3b. The elastic body 80 may be made of circle-shaped rubber, resin, metal wire, or sheet metal.

Even with this structure, the same effect as the first embodiment can be achieved. With this structure, the friction between the fitting concave portion 5e and roller 3b is reduced during overrunning, and the roller 3b can easily ride over the fitting concave portion 5e when an excessive torque is applied.

The spring 3c can be omitted in each embodiment explained above.

The present invention has been described with reference to various embodiments which are presently preferred. However, it is to be understood that the present invention should not be limited to the foregoing embodiments but may be modified in many ways without departing from the spirit of the invention.

What is claimed is:

1. A starter structure having an overrunning clutch, comprising:

a starter motor;

a drive shaft constructed and arranged to be driven by said starter motor;

a pinion axially movably mounted on said drive shaft and constructed and arranged to be selectively engageable with an engine ring gear;

the overrunning clutch being disposed to regulate transmission of torque between said starter motor and said pinion, said overrunning clutch including:

an outer tubular portion and an inner tubular portion placed with a clearance therebetween in the radial direction and facing so as to rotate freely relative to one another, one of said outer tubular portion and said inner tubular portion being fixed;

at least one rolling element;

at least one wedge-shaped groove which accommodates said rolling element, each said groove being formed concavely on one of an inner circumference of said outer tubular portion and an outer circumference of said inner tubular portion; and at least two concave portions each of which selectively fittingly engages said rolling element, said at least two concave portions being formed concavely on an other one of said inner circumference of said outer tubular portion and said outer circumference of said inner tubular portion, a depth of each said concave portion being determined to keep said rolling element received therein while said rolling element is kept pressed to an end wall of said wedge-shaped groove when a predetermined starter drive torque usually required for starting an engine is applied between said outer tubular portion and said inner tubular portion, said depth of each said concave portion further being a value such that said rolling element can move from one concave portion to an other concave portion while said rolling element is kept pressed to the end wall of said wedge-shaped groove when an excessive impact torque, exceeding the predetermined starter drive torque usually required for starting an engine, is applied between said outer tubular portion and said inner tubular portion in a direction to move said rolling element toward a short depth side of said wedge-shaped groove, thereby reducing said excessive impact torque.

2. The starter structure having an overrunning clutch according to claim 1, wherein said concave portions are formed circumferentially and are more in number than said wedge-shaped groove.

3. The starter structure having an overrunning clutch according to claim 1, in combination with:

a starter motor having an armature shaft;

a speed reduction mechanism including a sun gear formed on said armature shaft an epicycle gear engaging said sun gear; and an internal gear engaging said epicycle gear, wherein one of said outer tubular portion and said inner tubular portion extends axially from a disc-shaped base section formed radially from one end of said internal gear and has a smaller diameter than said internal gear.

4. The starter structure having an overrunning clutch according to claim 3, wherein one of said tubular portions is formed from resin as a base material integrally with said internal gear.

5. The starter structure having an overrunning clutch according to claim 4, wherein said clearance is filled with a lubricant with a friction coefficient of 0.3 or less.

6. The starter structure having an overrunning clutch according to claim 5, wherein the friction coefficient of said lubricant is less than 0.18.

7. The starter structure having an overrunning clutch according to claim 3, wherein said outer tubular portion is formed with said at least one wedge-shaped groove and is fixed to said internal gear.

8. The starter structure having an overrunning clutch according to claim 3, further comprising:

a biasing member laid on said outer circumference of said inner tubular portion fixed to said internal gear and biasing said rolling element in a centrifugal direction by a centrifugal force thereof.

9. The overrunning clutch according to claim 8, wherein said biasing member includes a ring-shaped elastic member which is accomodated in a ring-shaped groove concavely formed on said outer circumference of said inner tubular portion and which expands with said centrifugal force.

10. A starter with an overrunning clutch comprising:

an armature shaft rotated by a starter motor;

a drive shaft coaxially disposed with said armature shaft and operatively coupled with said armature shaft; and a clutch mechanism operatively coupling said shafts and having a cylindrical clutch outer member, a cylindrical clutch inner member coaxially disposed in said clutch outer member, and a plurality of rollers disposed between said clutch outer member and said clutch inner member, wherein one of said clutch outer member and said clutch inner member is fixed;

wherein one of said clutch outer member and said clutch inner member is formed with a plurality of wedge-shaped spaces for accommodating said rollers therein and an other of said clutch outer member is formed with a plurality of indentations for each of said wedge-shaped spaces, wherein a depth of each of said indentations is determined to keep said rolling element received therein while said rolling element is kept pressed to an end wall of said wedge-shaped space upon application of a predetermined starter drive torque usually required for starting an engine, said depth of each of said indentations further being determined to be a value whereby each of said rollers is enabled to move from one indentation to another while said rolling element is kept pressed to an end wall of said wedge-shaped space upon application of excessive torque, exceeding a torque usually required for starting an engine, in a direction from said armature shaft to said drive shaft under a condition that said clutch outer member and said clutch inner member are locked to each other through said rollers.

11. The starter according to claim 10, wherein:

each of said wedge-shaped spaces has a radial depth increasing gradually from one circumferential end wall toward an other circumferential end wall thereof, whereby said rollers are moved toward said other circumferential end wall thereby releasing a lock condition between said clutch outer member and said clutch inner member upon overrunning of said drive shaft.

12. The starter according to claim 11, further comprising:

a plurality of springs disposed in said wedge-shaped spaces, respectively, for biasing said rollers toward said one circumferential end wall thereby to lock said clutch outer member and said clutch inner member upon application of a torque in said direction from said armature shaft to said drive shaft.

13. The starter according to claim 12, wherein said depth of said indentations is determined to enable a movement of said rollers upon application of said excessive torque while keeping said rollers in contact with said one circumferential wall.

14. The starter according to claim 13, wherein:

at least one of said clutch inner member and said clutch outer member is made of resin.

15. The starter according to claim 12, wherein:

each of said indentations has a smoothly curved bottom ending at a shoulder portion which contacts said rollers when said clutch outer member and said clutch inner member are locked;

said curved bottom having a gradually increasing depth toward said shoulder and having at said shoulder a largest depth as said depth of said indentations, whereby upon said overrunning of said drive shaft said rollers disengage from said shoulders and move along said curved bottom to a shortest depth.

16. The starter according to claim 10, wherein:

said determined depth of each of said indentations is equal to a largest depth of each of said indentations.

* * * * *